United States Patent [19]

Templeton

[11] 3,946,543
[45] Mar. 30, 1976

[54] POWER MOWER WITH HYDRAULIC DRIVE

[76] Inventor: William E. Templeton, 1807 W. Hanley Road, Lexington, Ohio 44904

[22] Filed: Dec. 21, 1972

[21] Appl. No.: 317,103

Related U.S. Application Data

[63] Continuation-in-part of Ser. No. 206,842, Dec. 10, 1971, abandoned.

[52] U.S. Cl. ................... 56/10.9; 56/11.9; 56/14.4; 56/16.9; 56/17.5; 56/17.6
[51] Int. Cl.² ........................................ A01D 43/02
[58] Field of Search ......... 56/10.6, 10.9, 11.9, 14.3, 56/14.4, 16.6, 16.9, 17.3, 17.5, 17.6, 158, 193, 317, 344, 364, 370, 372, 400.02, DIG. 12; 15/79

[56] References Cited
UNITED STATES PATENTS

| | | | |
|---|---|---|---|
| 2,270,646 | 1/1942 | Campbell | 56/14.4 |
| 2,601,752 | 7/1952 | Rose | 56/10.9 |
| 2,712,211 | 7/1955 | Smith et al. | 56/14.4 X |
| 2,998,690 | 9/1961 | Ferris | 56/16.9 |
| 3,024,587 | 3/1962 | Warnke | 56/14.4 |
| 3,438,184 | 4/1969 | Jellis, Jr. | 56/317 X |

*Primary Examiner*—Louis G. Mancene
*Assistant Examiner*—J. N. Eskovitz
*Attorney, Agent, or Firm*—Watts, Hoffmann, Fisher & Heinke Co.

[57] ABSTRACT

A method and apparatus for positioning and cutting grasses. In one embodiment, a power mower is provided with a rotating rake structure positioned forwardly of the cutter to prevent foreign objects from being admitted to the region of operation of the cutter. The rake structure also serves to lift, straighten and align grasses for shearing. In accordance with the preferred embodiment, a power mower is provided with forward and rearward rake structures to pick up grass blades, pull out matted weeds such as crabgrass, position the upstanding grass blades in a reciprocating cutter, and sweep grass clippings away from the cutter and into a grass catcher. A hydraulic drive system varys the drive speed by controlling fluid flow rate to a hydraulic drive motor.

18 Claims, 8 Drawing Figures

U.S. Patent   March 30, 1976   Sheet 1 of 3   3,946,543
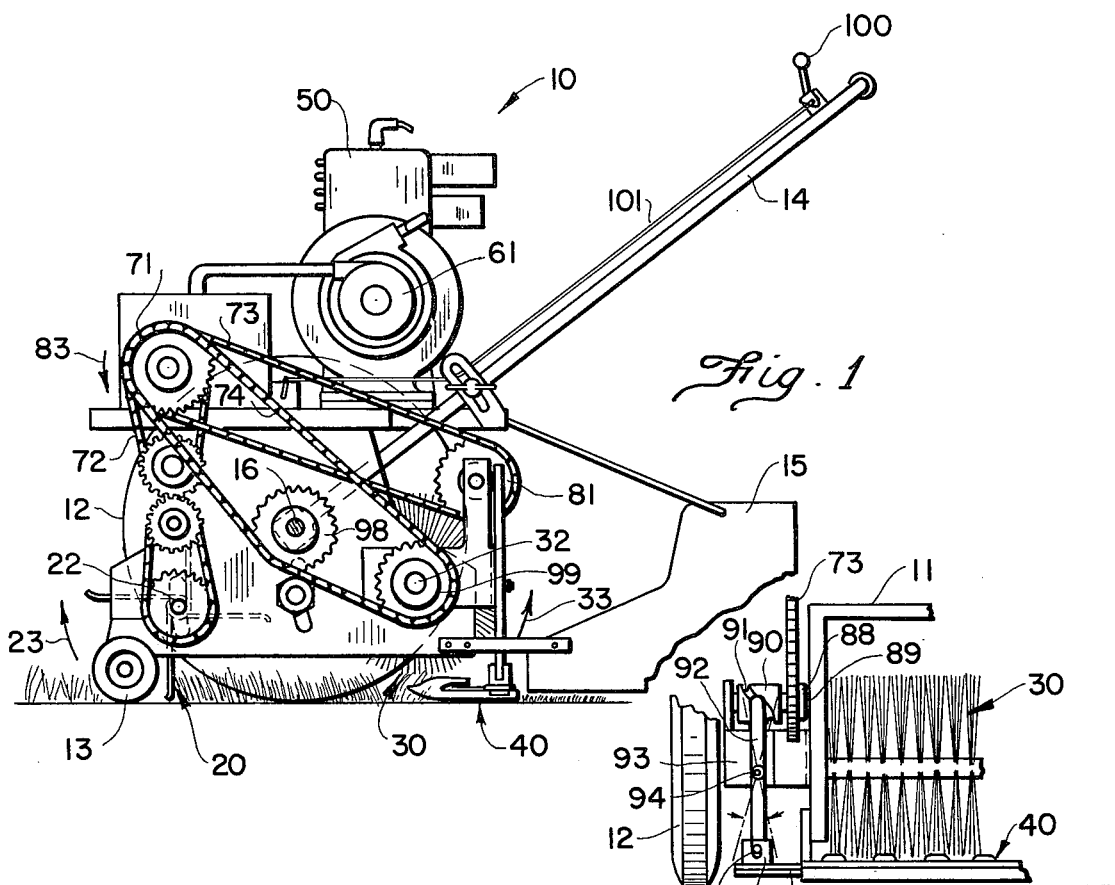
Fig. 1
Fig. 5
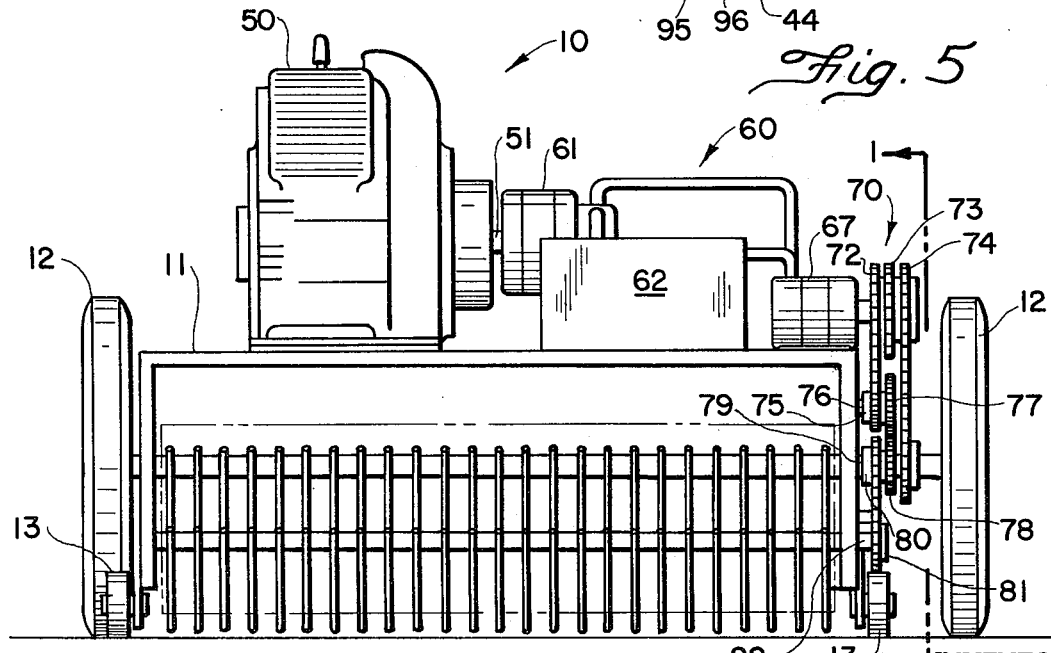
Fig. 2
INVENTOR.
WILLIAM E. TEMPLETON
BY
Watts, Hoffmann, Fisher & Heinke
ATTORNEYS 3,946,543

POWER MOWER WITH HYDRAULIC DRIVE

CROSS-REFERENCE TO RELATED PATENT AND APPLICATION

CUTTER BAR ASSEMBLY, U.S. Pat. No. 3,722,196 issued Mar. 27, 1973 to William E. Templeton.

METHOD AND APPARATUS FOR POSITIONING AND CUTTING GRASSES, Ser. No. 206,842 filed Dec. 10, 1971 by William E. Templeton, now abandoned, of which this application is a continuation-in-part.

BACKGROUND OF THE INVENTION

1. Field of the Invention

The present invention relates generally to mowers of the type used to shear grasses growing on a ground surface, and more particularly to a method and apparatus for combing, positioning, and cutting grasses through the use of one or more rotary driven rake structures positioned generally forwardly of a cutter. Depending on the positioning, structure, and direction of rotation of the rotary rake structures, the rake structures may additionally serve the functions of pulling out matted weeds such as crabgrass, preventing the admission of foreign objects to the region of the cutter, and sweeping grass clippings into a grass catcher.

2. The Prior Art

Three basic types of mechanical grass cutting devices are well known. First, there is the rotary lawn mower having a relatively long thin blade disposed for high speed rotation in a horizontal plane about a vertical axis. Second, there is the reel type lawn mower wherein a cylindrical cutter assembly rotates about a horizontal axis to provide a shearing action in conjunction with one or more fixed blades. Third, there is the reciprocating cutter wherein a cutter bar assembly carrying a plurality of forwardly projecting tines having sharpened surfaces cooperates with a sickle or cutter which is reciprocated cyclically back and forth to achieve a shearing action. One such reciprocating cutter is described and claimed in the referenced patent.

Rotary and reel type systems are inherently simpler and less expensive than reciprocating cutters. Since the quality of the cutting job on residential lawns has not been substantially different whether a reel type, rotary type, or reciprocating cutter type mower is used, the rotary and reel type systems have been widely used in residential lawn mowers. Reciprocating cutters, on the other hand, are well adapted to handle the heavy load of harvesting tall grass crops and, accordingly, have been used almost exclusively in farm-implement applications.

One drawback of all three types of mowers is that they are equipped to do little, if anything, to prevent the admission of foreign objects to the region of the cutter. When foreign objects such as sticks, stones, pieces of metal, and the like are contacted by the cutter, the cutter is frequently damaged or jammed. The object is frequently propelled by the cutter in the manner of a missile and can do considerable harm to the operator or to other objects positioned in its flight path. While a wide variety of guards have been proposed in an effort to prevent the entry of objects to the region of cutter operation and to stop objects propelled outwardly from the cutter, the fact remains that many injuries and a good deal of damage to mowers and other property occurs each year due to foreign objects contacting the cutters of mowers.

Still another drawback of known prior art lawn mowers is that they are in no way equipped to pick up or pull out such matter low-growing weeds as crabgrass. Rather, known lawn mowers trim the grass at a height above such low growing weeds and do nothing to disturb their growth and spread.

Present day rotary and reel type residential lawn mowers are equipped to do little, if anything, to position grass blades in an erect, upright attitude for engagement by the rotating blade. Consequently grass blades which are bent downwardly are frequently not picked up by the mower for shearing at equal lengths with upstanding blades of grass, and an uneven grass cutting job results.

SUMMARY OF THE INVENTION

The present invention overcomes the foregoing drawbacks of the prior art and provides a novel and improved method and apparatus for combing grasses prior to cutting to remove foreign objects, for picking up and pulling out such matted weeds as crabgrass, and for positioning grass blades in an erect upstanding attitude for even shearing.

In accordance with one embodiment of the present invention, known types of rotary, reel type and reciprocating cutter lawn mowers are provided with a generally cylindrical rotary driven rake structure positioned forwardly of the cutter. The rake structure is driven in a direction best described as opposite to the direction of rotation of the ground supporting wheels during forward mower movement. The teeth of the rake structure reach into the grasses ahead of the cutter and lift foreign objects out of the grasses. The angular velocity of the rake structure is adjusted such that foreign objects picked up by the rotating rake structure are gently tossed a short distance, typically 3 or 4 feet, ahead of the mower where they can be picked up in safety by the operator.

The rotary rake comprises relatively rigid spaced teeth which reach into and lift the grasses ahead of the mower. The rake aligns and straightens the grasses thereby facilitating an even shearing of the grasses by the cutter. The rake also serves to pick up and pull out low-growing matted weeds, such as crabgrass. Tests made with lawnmowers equipped with rake structures in accordance with the present invention have shown that the average lawn can be entirely ridded of noticeable crabgrass in only a few mowings.

Where the lawn is free of foreign objects and the object deflecting feature of the rake is not required, the rake can be rotated in the opposite drive direction, i.e., in the same direction as the wheels during forward mower movement. The rake then serves to lift, straighten and align grasses as well as to pull out matted weeds, but does not serve to toss foreign objects away from the cutter.

In accordance with preferred embodiment of the present invention, a mower of the reciprocating cutter type is provided with a forward and a rearward rake structures. The forward rake structure comprises a plurality of spaced, relatively rigid teeth which serve the aforedescribed purposes of (1) object deflection, (2) grass lifting, straightening and aligning, as well as (3) matted weed pulling. The rearward rake structure comprises a cylindrical brush-like arrangement of closely spaced relatively flexible bristles. This second or rearward rake rotates in the same direction as the supporting wheels of the mower. The rearward rake serves to move the upstanding grass blades into the reciprocating cutter while positioning them in an upright attitude. Accordingly, an exceptionally even cut is achieved, whether the mower be set to cut the grasses at the very short height of only a fraction of an inch, or at the relatively tall height of several inches.

Since the reciprocating cutter does not employ blades that rotate in the vicinity of the shearing station, there is no interference with cutter operation caused by the positioning of the rearward rake structure in closely spaced arrangement over the shearing station. Accordingly, the improved mower of the preferred embodiment features not only a precision grass positioning system for assuring an even cut, but also provides the exceptionally long operating life and reliability of a reciprocating-type cutter system.

The rear rake structure also serves to propel grass clippings upwardly and rearwardly of the cutter and into a grass catching bag. This action serves not only to keep the cutter clean and free of grass build up, but also provides an effective system for collecting cut grass and such crabgrass type weeds as are picked up and pulled out by the front rake.

Still another feature of the preferred embodiment of the present invention is the drive system which reciprocates the cutter, rotates the rake structures, and propels the mower. Whereas known power lawn mowers commonly regulate cutter speed by adjusting the operating speed of a gasoline engine, the present invention provides a hydraulic drive system, interposed between an engine and the driven elements. By varying the flow rate of hydraulic fluid to a hydraulic motor, cutter speed can be varied without changing engine speed. Accordingly, a simple and inexpensive drive system is provided for varying the relative speed of the cutter and the engine.

It is a general object of the present invention to provide a novel and improved method and apparatus for positioning an cutting grasses.

It is another object to provide a mowing apparatus having a rake structure positioned forward of the cutter to prevent the entry of foreign objects into the region of cutter operation.

It is still another object of the present invention to provide a mowing apparatus including a pair of rotating rake structures for positioning grasses for shearing by a reciprocating cutter.

Other objects and a fuller understanding of the present invention may be had by referring to the following description and claims taken in conjunction with the accompanying drawings.

BRIEF DESCRIPTION OF THE DRAWINGS

FIG. 1 is a side elevational view of a lawn mower constructed in accordance with the preferred embodiment of the present invention, as seen from the plane indicated by the line 1—1 in FIG. 2;

FIG. 2 is a front elevational view of the mower of FIG. 1;

FIG. 5 is a rear elevational view of a portion of the mower of FIG. 1 showing in greater detail the mechanical drive system for the reciprocating cutter;

DESCRIPTION OF THE PREFERRED EMBODIMENT

Figure 3:
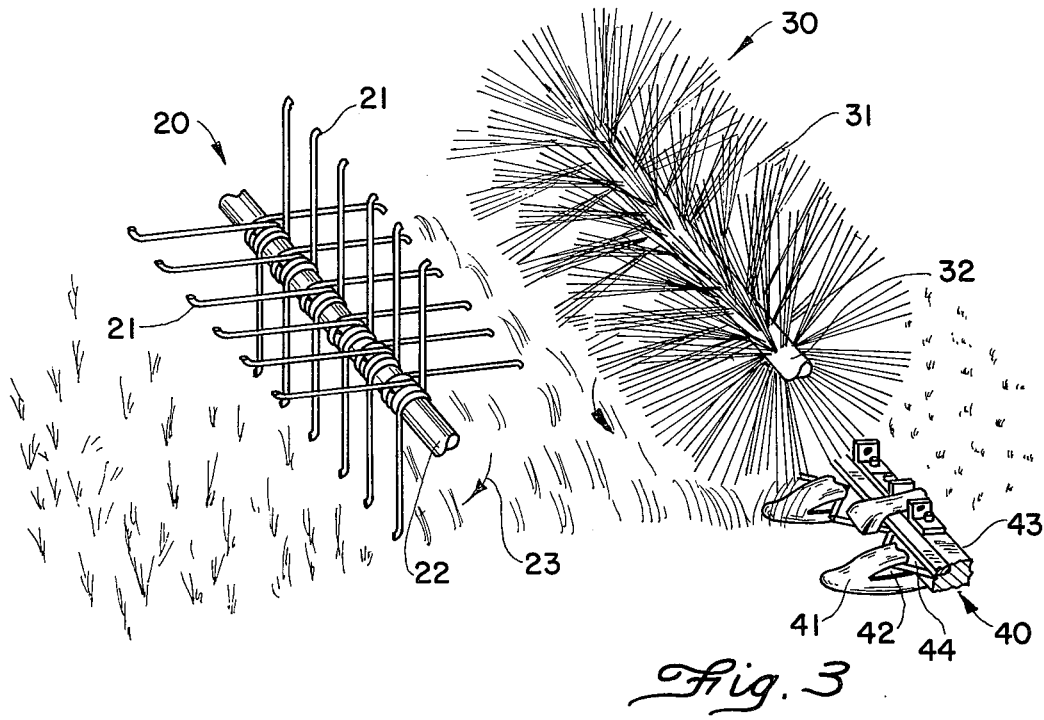
FIG. 3 is an enlarged schematic view illustrating the grass positioning action of the mowing system of FIGS. 1 and 2.

A power lawn mower is shown generally at 10 in FIGS. 1 and 2. The mower includes a frame structure 11 supported by a pair of relatively large diameter drive wheels 12 and a pair of smaller forward balance wheels 13. A handle 14 projects rearwardly and upwardly from the frame structure 11. A grass catcher 15 is positioned rearwardly of the frame structure 11 and beneath the handle 14.

The mower 10 principally comprises a mowing system including a forward and rearward rake structures 20, 30 and a reciprocating cutter 40, as will be described in greater detail. These elements are driven by means of an engine 50 which powers a hydraulic drive system indicated generally by the numeral 60. The hydraulic system 60 is coupled by a mechanical drive system 70 to the drive wheels 12, to the rake structures 20, 30 and to the cutter 40.

The mowing system is illustrated schematically in FIG. 3. The forward rake structure 20 includes a plurality of spaced teeth 21 carried on a shaft 22. The teeth 21 are preferably formed of a relatively rigid but resilient metal wire which will permit their deflection without breaking upon encountering an immovable obstacle. The ends of the shaft 22 are journaled for rotation by the frame structure 11.

The rearward rake structure 30 comprises a plurality of closely spaced bristles 31 which extend radially from a shaft 32. The bristles are preferably relatively flexible and together comprise a generally cylindrical brush. The ends of the shaft 32 are journaled for rotation by the frame structure 11.

In the embodiment shown in the drawings, the forward rake structure 20 rotates in the direction of arrow 23, which is opposite to the direction of the drive wheels 12 when the mower is moving forwardly. The rearward rake structure 30 rotates in the direction of arrow 33, which is the same as the direction of rotation of the drive wheels 12 when the mower is moving forwardly. The teeth 21 of the forward rake structure 20 reach into the grasses ahead of the mower to lift the grass blades and to pick up and pull out such matted weeds as crabgrass. The teeth 21 also lift foreign objects out of the grasses and serve to gently toss such foreign objects forwardly of the mower. In effect the forward rake structure serves to lift the grass blades. Where the forward rake is rotated in the opposite direction to that of the drive wheels 12, it also serves to lean the grass blades slightly forwardly, away from the oncoming mower. Where the forward rake structure 20 is driven in the same direction of rotation as the drive wheels 12, it will not serve the function of removing objects from the path of the cutter but will serve to lift, straighten and align grasses to facilitate even cutting.

The rearward rake structure 30 engages the upstanding grass blades and positions them in the cutter 40. At the time of shearing, the majority of the grass blades are standing substantially erect. Accordingly, an extremely even shearing action is effected.

The cutter 40 is positioned generally beneath the rearward rake structure 30. This enables the rearward rake structure 30 to perform the dual functions of moving the upstanding grass blades into the cutter, and sweeping the grass clippings upwardly and rearwardly into the grass catcher 15.

The cutter 40 is of the type described and claimed in the referenced patent. A plurality of forwardly projecting guards 41 each carrying sharpened ledger plates 42 are supported by a relatively rigid bar structure 43. The ledger plates 42 cooperate with a reciprocable cutter or sickle 44 to provide a shearing action.

Figure 4:
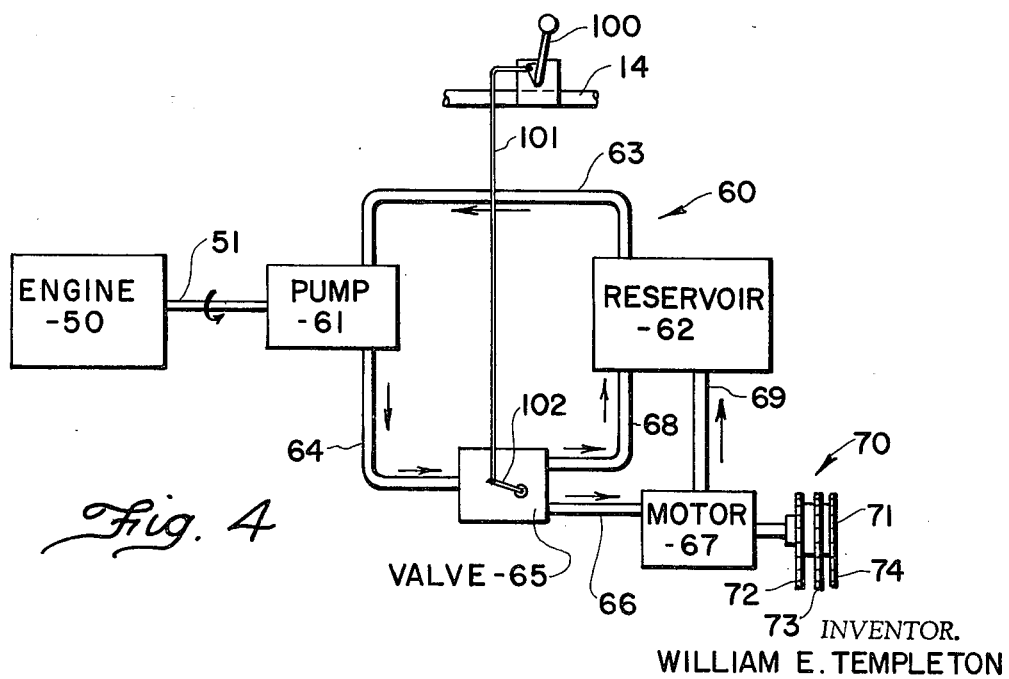
FIG. 4 is a schematic block diagram illustrating the drive system of the preferred embodiment.

The drive system for the mower is illustrated schematically in FIG. 4. The gasoline engine 50 has its output shaft 51 coupled to a hydraulic pump 61. Rotation of the pump 61 pumps hydraulic fluid from a reservoir 62 by means of a conduit 63 into a conduit 64. The conduit 64 directs the pressurized hydraulic fluid into a bypass valve 65. Depending on the setting of the bypass valve 65, a portion or all of the hydraulic fluid is directed either through a conduit 66 to a hydraulic motor 67, or through a conduit 68 to the reservoir 62. From the motor 67, the fluid flows through a conduit 69 to the reservoir.

The mechanical drive system 70 connects by means of a triple-drive chain sprocket 71 to the motor 67. Three drive chains 72, 73, 74 are reeved around the sprocket 71 to drive the various mower components.

The drive chain 72 serves to drive the forward rake structure 20 through a direction reversing gear train. The chain 72 extends downwardly from the sprocket 71 and around a second sprocket 75. The sprocket 75 is rotatably mounted on a shaft 76 carried by the frame structure 11. A first gear 77 rigidly connects with the sprocket 75 for rotation therewith. A second gear 78 meshes with the first gear 77 and is rotatably mounted on a shaft 79 carried by the frame structure 11. A third sprocket 80 rigidly connects with the second gear 78 for rotation therewith. The forward rake shaft 22 is provided with a sprocket 81. A roller chain 82 is reeved around the sprockets 80, 82 so as to drive the forward rake structure 20. By this arrangement, rotation of the sprocket 71 in the direction of arrow 83 will cause rotation of the forward rake structure in the direction of arrow 23.

The drive chain 73 serves to drive the reciprocating cutter. The chain 73 is reeved around the drive sprocket 71 and around a sprocket 88. As is best illustrated in FIG. 5, the sprocket 88 is rotatably mounted on a shaft 89 carried by the frame structure 11. A collar 90 provided with a continuous cam slot 91 is carried by the shaft 89 and is connected to the sprocket 88 for rotation therewith.

An arm 92 translates the rotary motion of the cam 91 into a reciprocating motion to drive the cutter 40. A bracket 93 carried by the frame structure 11 pivotally mounts the arm 92 at a position 94 intermediate the ends of the arm. The upper end of the arm 92 is provided with a bearinged projection, not shown, which extends into the cam slot 91. The lower end of the arm 92 is provided with a bearinged projection 95 which extends into a U-shaped head 96 carried by the sickle 44. By this arrangement, rotation of the cam 91 will cause the arm 92 to oscillate, and the sickle 44 to reciprocate.

The drive chain 74 serves to rotate both the rearward rake structure 30 and the drive wheels 12. The drive wheels 12 are both mounted on an axle 16 which is journaled for rotation on the frame structure 11. A sprocket 98 is keyed to the axle 16 to drive the axis. The rearward rake shaft 32 is provided with a drive sprocket 99. The chain 74 is reeved around the sprockets 71, 98, 99 to drive the wheels 12 and the rearward rake.

In order to control the forward speed of the mower 10 as well as the speed of rotation of the rake structures and the speed of reciprocation of the reciprocating cutter, a control lever 100 is provided on the handle 14. The control lever is pivotably mounted on the handle 14 and connects with a control cable 101.

Referring to FIG. 4, the control cable 101 connects with the actuator 102 of the bypass valve 65 to selectively proportion the flow of hydraulic fluid between the conduits 66, 68. When the valve actuator 102 is set to divert the entire fluid flow through the conduit 68 to the reservoir 62, the motor 67 does not rotate and the mower 10 stands still. As the valve actuator 102 is moved to direct an increasingly larger proportion of the fluid flow through the conduit 66 to the motor 67, the output shaft of the motor begins to rotate with increased speed. Accordingly, the desired drive speed may be set by moving the handle 100, and no adjustment of the speed of engine 50 is needed.

According to the method of the present invention, grasses are positioned for shearing in a reciprocating cutter by means of at least one rotating rake structure, as described above. The grass blades are preferably initially combed forwardly by a first rotatable rake structure to remove foreign objects and to lift, straighten and align the grass blades for shearing. In accordance with the preferred method, the grass blades are subsequently positioned for shearing in a reciprocating cutter by a second rake structure. The first rake structure is preferably provided with spaced, relatively rigid teeth for picking up and pulling out matted grass growths such as crabgrass. The second rake structure preferably comprises a generally cylindrical brush having a plurality of closely spaced generally flexble bristles, and serves to sweep grass clippings away from the cutter and into a grass catcher.

In accordance with another feature of my invention, a single rake structure is disposed forwardly of the cutter of a reciprocating or reel type mower and is rotated in a direction opposite to the direction of rotation of the mower wheels when the mower is moved along a forward path of travel.

Figure 6:
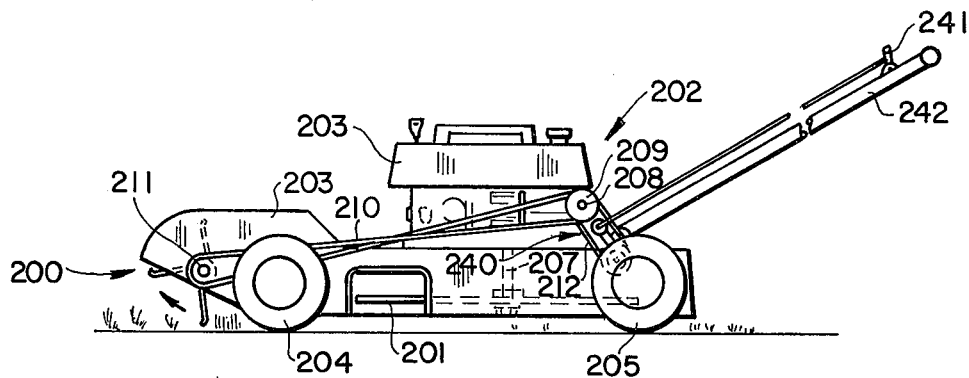
FIG. 6 is a side elevational view of a rake structure incorporated in a rotary mower in accordance with another embodiment of the present invention.
Figure 7:
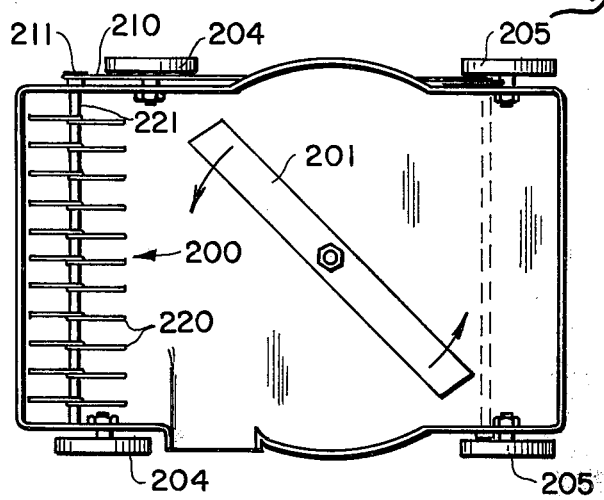
FIG. 7 is a bottom plan view of the mower of FIG. 5.

Referring to FIGS. 6, 7, a single rake structure 200 is shown positioned forwardly of the cutting blade 201 of a rotary mower 202. The mower 202 includes a housing 203 supported on ground engaing wheels 204, 205.

An engine 206 is supported atop the housing 203. A first drive shaft 207 depends from the engine 206 into the housing 203 and mounts the blade 201. A second drive shaft 208 extends horizontally and supports a double V-belt pulley 209. A first V-belt 210 is reeved around the pulley 209 and around a rake pulley 211. A second V-belt 212 is reeved around the pulley 209 and around a wheel drive pulley 213.

The rake 200 comprises a plurality of relatively rigid, spaced spring teeth 220 mounted on a shaft 221. Opposite end regions of the shaft 221 are journaled for rotation by the housing 203. The rake drive pulley 211 is rigidly secured to the shaft 221 for rotation therewith.

Figure 8:
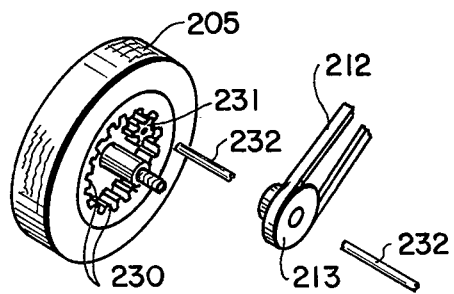
FIG. 8 is a schematic exploded view illustrating the connection of the power drive system to the rear mower wheels in the embodiment of FIGS. 6 and 7.

Referring to FIG. 8, the rear drive wheels 205 each have gear teeth 230 formed internally thereof. Drive pinions 231 are rigidly mounted on a shaft 232 and positioned to drivingly engage the teeth 230. The shaft 232 is journaled for rotation by the housing 203. The wheel drive pulley 213 is rigidly secured to the shaft 232 for rotation therewith.

A lever-operated belt-tightening clutch of conventional configuration, indicated generally by the numeral 240 is positioned in engagement with the belt 212. By manipulation of a lever 241 mounted on the mower handle 242, the belt 212 can be tightened or loosened to drivingly interconnect or disconnect the engine 203 and the wheels 205.

The housing 203 shields the rake 200 from above to prevent foreign objects picked up by the rake from being discharged upwardly or toward the operator. The rake 200 serves to comb grasses ahead of the cutter blade 201 to lift, straighten and align the grasses. The rake 200 also serves to pick up foreign objects such as sticks, stones, tin cans, and the like out of the grasses and to toss them gently to a position slightly forwardly of the mower, e.g. 3 or 4 feet, where they can be retrieved by the operator.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a mower of the type having a frame structure supported on ground engaging wheels for movement along a forward path of motion over a ground surface, and a cutter carried by the frame structure for movement relative thereto to shear grasses as the mower is moved along the path, the wheels being rotatable about axes which extend generally parallel to the ground surface over which the mower is operated, the wheels being rotatable in a given direction of rotation when the mower moves forwardly along said path, the improvement comprising:
   a. rake means including a first rotatable rake structure carried by the frame structure at a position forwardly of the cutter and being rotatable in a direction opposite such given direction about an axis generally parallel to the ground surface over which the mower is operated for combing grasses encountered ahead of the cutter, for leaning such grasses in a direction facing away from the cutter to lift, straighten and align the grasses, and for removing foreign objects from these grasses during combing;
   b. said rake structure having a plurality of teeth operable to engage grasses encountered along the path ahead of the cutter; and
   c. drive means coupled in driving relationship to said rake structure for rotating said rake strcture in a direction opposite such given direction to comb grasses encountered ahead of the cutter and lean these grasses forwardly in a direction facing away from the cutter to lift, straighten and align the grasses, such combing action being operative to remove foreign objects from these grasses during combing.

2. The mower of claim 1 wherein said first rake structure is generally cylindrical in shape and comprises a plurality of spaced, relatively rigid spring mounted teeth operative to engage, lift, and deflect foreign objects forwardly of the mower.

3. In a mower of the type having a frame structure supported on ground engaging wheels for movement along a forward path of motion over a ground surface, and a reciprocating cutter carried by the frame structure for movement relative thereto to shear grasses as the mower is moved along the path the improvement comprising:
   a. a first rotatable rake structure carried by the frame structure at a position forwardly of the cutter and being rotatable about an axis generally parallel to the ground surface over which the mower is operated;
   b. said rake structure having a plurality of teeth operable to engage grasses encountered along the path ahead of the cutter;
   c. drive means coupled in driving relationship to said rake structure to rotate said rake structure to lift, straighten and align grasses encountered ahead of the cutter;
   d. a second rake structure carried by said frame structure at a position to the rear of said first rake structure and over said cutter, said second rake structure being rotatable relative to said frame structure about an axis of rotation substantially paralleling the axis of rotation of said first rake structure; and
   e. said drive means coupled in driving relationship to said second rake structure to rotate said second rake structure to position grasses which have been combed by said first rake structure in an erect attitude in said cutter.

4. The mower of claim 3 wherein said second rake structure comprises a generally cylindrical brush having a plurality of relatively closely spaced radially extending bristles.

5. A power lawn mower comprising:
   a. a frame structure supported on at least a pair of ground engaging rotatably mounted wheels for movement along a forward path of travel, the wheels being rotatable about axes which extend generally parallel to the ground surface over which the mower is operated, the wheels being rotatable in a given direction of rotation when the mower moves forwardly along said path;
   b. a cutter bar assembly carried by said frame structure and including a cutter mounted for reciprocation in directions generally parallel to the ground surface and generally perpendicular to the forward path of travel;
   c. rake means including a generally cylindrical rake structure rotatably carried by said frame structure at a position forward of said cutter for rotation in a direction opposite such given direction about an axis generally parallel to the directions of reciprocation of said cutter for combing grasses in a direction away from said cutter to straighten and align such grasses for shearing and for removing foreign objects from such grasses during combing; and,
   d. drive means connected to said cutter and said rake structure for reciprocating said cutter and for rotating said rake structure in a direction opposite such given direction to comb grasses in a direction away from said cutter to straighten and align the grasses for shearing and to remove foreign objects from the grasses during combing.

6. A power lawn mower comprising:
a. a frame structure supported on at least a pair of ground engaging rotatably mounted wheels for movement along a forward path of travel;
b. a cutter bar assembly carried by said frame structure and including a cutter mounted for reciprocation in directions generally parallel to the ground surface and generally perpendicular to the forward path of travel;
c. a generally cylindrical rake structure rotatably carried by said frame structure at a position forward of said cutter for rotation about an axis generally parallel to the direction for reciprocation of said cutter;
d. drive means connected to said cutter and said rake structure to reciprocate said cutter and rotate said rake structure to comb grasses and foreign objects in directions away from said cutter;
e. a generally cylindrical brush rotatably carried by said frame structure at a position to the rear of said rake structure and above said cutter for rotation about an axis paralleling the directions of reciprocation of said cutter; and
f. said drive means also being connected to said brush to rotate said brush in a direction opposite to the direction of rotation of said rake structure to position the combed grasses in said cutter.

7. The power lawn mower of claim 6 additionally including a grass catcher positioned rearwardly of said cutter such that said brush serves to propel grass clippings from the region of said cutter and into said grass catcher.

8. A power lawn mower comprising:
a. a frame structure supported on at least a pair of ground engaging rotatably mounted wheels for movement along a forward path of travel;
b. cutter means carried by said frame structure and including a cutter mounted for movement relative to said frame structure for shearing grasses;
c. a rake structure comprising a plurality of spaced generally rigid teeth, said rake structure being rotatably mounted on said frame structure at a position forward of said cutter means for rotation about an axis generally parallel to the ground surface and generally perpendicular to the forward path of travel of the mower;
d. drive means connected to said cutter means and to said rake structure to move said cutter means to effect a shearing action and to rotate said rake structure whereby said rake structure serves to lift and align grasses encountered ahead of said cutter;
e. said cutter means comprising a reciprocating cutter; and,
f. a generally cylindrical brush rotatably carried by said frame structure at a position to the rear of said rake structure and above said reciprocating cutter for rotation about an axis generally parallel to the axis or rotation of said rake structure, said drive means additionally serving to rotate said brush, whereby said brush serves to position the upstanding grass blades which have been combed and straightened by said rake structure in a substantially erect attitude in said cutter.

9. The power lawn mower of claim 8 wherein said drive means serves to rotate said rake structure in a direction opposite to the direction of rotation of the ground engaging wheels during forward movement of the mower, and to rotate said brush in a direction opposite to the direction of rotation of said rake structure.

10. A mower comprising:
a. a frame structure;
b. a pair of rotatable rake means carried by said frame structure for rotation relative thereto about spaced parallel axes, said axes being generally parallel to a ground surface over which the mower is to operate and being generally perpendicular to a path of forward movement of the mower, one of said rake means being positioned forwardly of the other rake means to engage grasses growing on said ground surface prior to said other rake means;
c. a cutter bar assembly carried by said frame structure and including a cutter mounted for reciprocation in directions parallel to said axes;
d. drive means connecting with said pair of rake means and said cutter to rotate said rake means and to reciprocate said cutter;
e. said cutter being positioned to receive and shear grasses as they are combed rearwardly by said other rake means whereby said one rake means serves to lift and straighten grasses to be sheared, and said other rake means serves to position said grasses within the path of reciprocation of said cutter;
f. said drive means being operable to rotate said one rake means in a direction which will comb grasses to pick up the grass blades and lean them in a direction away from the direction of forward movement of the mower, and to rotate said other rake means in the opposite direction to deflect the forward leaning grasses rearwardly into the cutter.

11. The mower of claim 10 wherein said one rake means comprises a generally cylindrical rake structure having relatively widely spaced teeth, and said other rake means comprises a generally cylindrical brush having a plurality of relatively closely spaced radially extending bristles.

12. The mower of claim 11 wherein said frame structure comprises a frame supported on a plurality of rotatably mounted ground engaging wheels, and said drive means connects with at least two of said wheels to drive the mower.

13. The mower of claim 12 wherein said drive means comprises a source of rotary motion, a hydraulic pump coupled to said source, a hydraulic motor, means hydraulically coupling said pump to said motor to rotate said motor in response to rotation of said pump, and means coupling said hydraulic motor to said pair of rake means, to said pair of wheels, and to said cutter.

14. The mower of claim 13 wherein said means hydraulically coupling said pump to said motor comprises a bypass valve means adapted to regulate the flow rate of hydraulic fluid to said motor.

15. A lawn mower comprising:
a. a frame structure supported on at least a pair of ground engaging rotatably mounted wheels for movement along a forward path of travel over the ground;
b. a pair of rotatable rake means carried by said frame structure for rotation relative thereto about spaced parallel axes, said axes being generally parallel to a ground surface over which the mower is to operate and being generally perpendicular to a path of forward movement of the mower, one of said rake means being positioned forwardly of the other rake means to engage grasses growing on said ground surface prior to said other rake means;

c. a cutter bar assembly carried by said frame structure and including a cutter mounted for reciprocation in directions parallel to said axes;

d. drive means connecting with said pair of rake means and said cutter to rotate said rake means and to reciprocate said cutter;

e. said cutter being positioned generally beneath said other rake means to receive and shear grasses as they are combed rearwardly by said other rake means;

f. said one rake means comprising a generally cylindrical rake structure having a plurality of relatively widely spaced teeth which serve to lift and straighten the grasses to be sheared;

g. said other rake means comprising a generally cylndrical brush having a plurality of relatively closely spaced radially extending bristles which serve to position grasses within the path of reciprocation of said cutter;

h. said drive means being operable to rotate said one rake means in a direction which will comb grasses away from said cutter bar to pick up and straighten the grass blades and lean them in a direction away from the direction of forward movement of the mower, and to rotate said other rake means in the opposite direction to deflect the forward leaning grasses rearwardly into the cutter.

16. A method of positioning and cutting grasses, with a mower including a frame supporting a reciprocating cutter on ground engaging wheels for movement in a forward direction over a ground surface, comprising the steps of:

a. raking the grass blades with a first rotatable rake structure carried by the mower frame to lift and straighten the grasses to be sheared;

b. raking the grasses which have been straightened by the first rake structure into the reciprocating cutter with a second rotatable rake structure carried by the mower frame to position grasses in an upright attitude within the path of reciprocation of the cutter;

c. said step of raking the grass blades with a first rake structure being carried out by rotating said first rake structure in a direction opposite to the direction of rotation of the ground engaging wheels during forward movement of the mower, whereby said first rake structure additionally serves to prevent the entry of foreign objects into the region of operation of the cutter.

17. The method of claim 16 wherein the first rake structure is provided with generally rigid teeth which additionally serve to pick up and pull out matted grass growths as the mower advances.

18. The method of claim 16 wherein the second rake structure comprises a generally cylindrical brush having a plurality of closely spaced generally flexible bristles which additionally serve to sweep grass clippings away from the region of the cutter and into a grass catcher as the mower advances.

* * * * *